United States Patent [19]

Kelly

[11] 4,411,580
[45] Oct. 25, 1983

[54] VEHICLE ATTACHED SUPPORT FOR WHEELCHAIR TRANSPORT

[76] Inventor: Danny R. Kelly, P.O. Box 772, Nicoma Park, Okla. 73066

[21] Appl. No.: 313,059

[22] Filed: Oct. 19, 1981

[51] Int. Cl.³ ............................................. B60R 9/06
[52] U.S. Cl. ............................ 414/462; 224/42.03 R; 224/42.08; 224/42.21; 414/921
[58] Field of Search ................... 414/462–466, 414/921; 224/42.03 R, 42.03 B, 42.06, 42.08, 42.21; 296/37.2

[56] References Cited

U.S. PATENT DOCUMENTS

| | | | |
|---|---|---|---|
| 1,445,913 | 2/1923 | Roos | 414/466 X |
| 1,864,829 | 6/1932 | Kennedy et al. | 414/464 |
| 2,377,149 | 5/1945 | Heil | 414/463 |
| 2,991,894 | 7/1961 | Walker | 414/466 |
| 3,613,971 | 10/1971 | Betz | 224/42.21 X |
| 3,794,227 | 2/1974 | Stearns | 224/42.03 B X |
| 4,213,729 | 7/1980 | Cowles et al. | 414/462 |
| 4,275,981 | 6/1981 | Bruhn | 414/462 |

FOREIGN PATENT DOCUMENTS

| | | | |
|---|---|---|---|
| 47949 | 4/1974 | Australia | 224/42.03 B |
| 54-129625 | 10/1979 | Japan | 414/466 |

*Primary Examiner*—Leslie J. Paperner
*Attorney, Agent, or Firm*—Robert K. Rhea

[57] ABSTRACT

A vehicle attached wheelchair support is formed by a stationary frame mounted on a horizontal base tube and a lateral pivotally connected frame joined to the base tube permitting movement of one end portion toward and away from the surface of the earth. The base tube is telescopically joined to a socket forming member secured to an end surface of a vehicle. The pivoting frame forms a space receiving the large wheels and major portion of a wheelchair in supporting relation. A handle on the pivoting frame enables the tilting frame to be lifted to a stationary frame locked position or moved toward the surface of the earth for loading and unloading the wheelchair.

2 Claims, 5 Drawing Figures

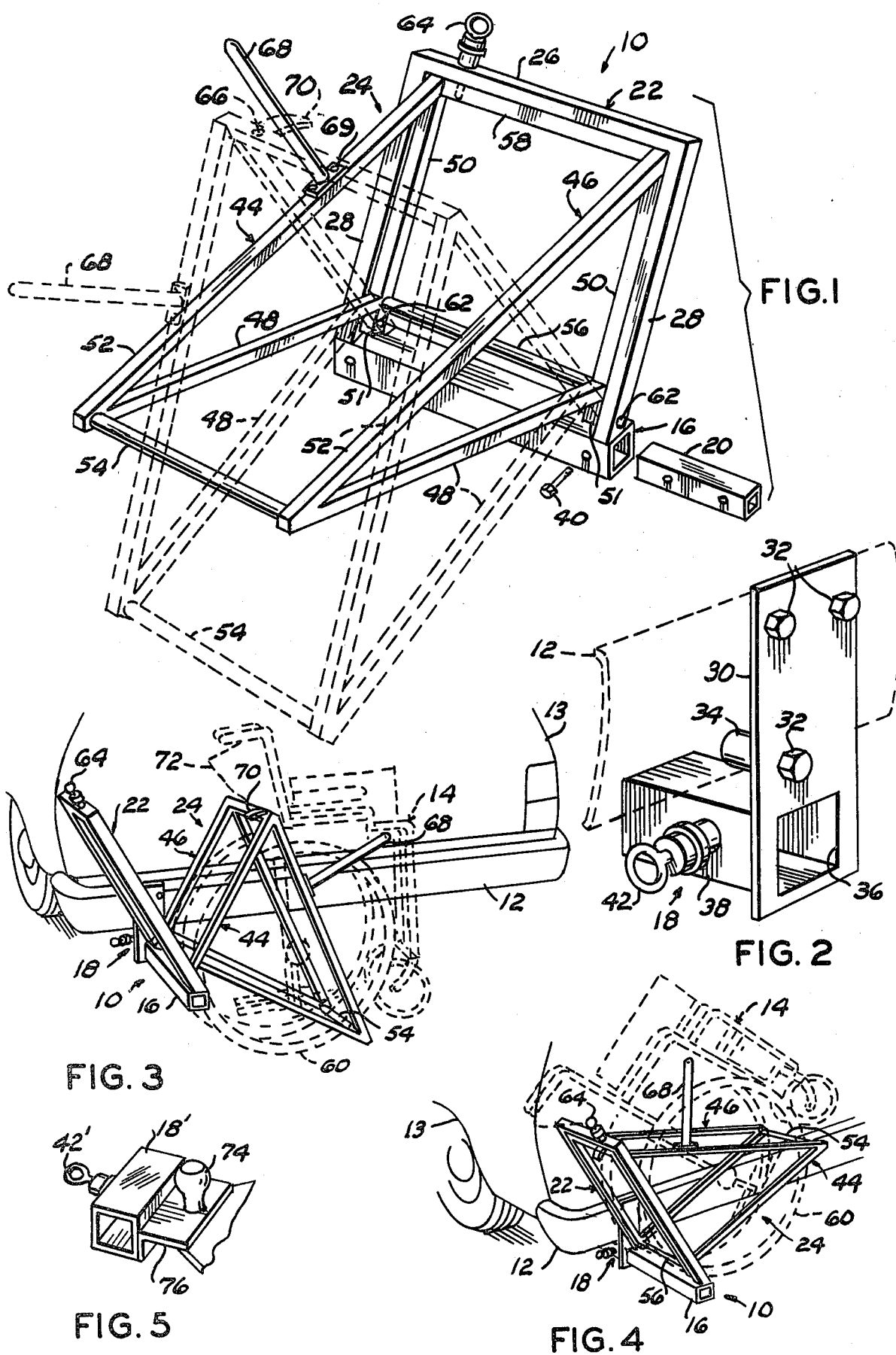

VEHICLE ATTACHED SUPPORT FOR WHEELCHAIR TRANSPORT

BACKGROUND OF THE INVENTION

1. Field of the invention.

The present invention relates to wheelchairs and more particularly to a vehicle attached support for transporting a foldable type wheelchair.

The structural design of automotive vehicles, particularly those commonly referred to as economy or compact models do not permit ease of loading and unloading a wheelchair of the collapsible or folding type into the passenger compartment or trunk area of the vehicle. Even in those vehicles of larger mass, the loading of a folding wheelchair into the passenger compartment or trunk area is not easily accomplished particularly by an individual of small stature.

This invention overcomes the inconvenience of transporting a foldable wheelchair by providing a tilting framework connected with the rearward end of an automotive vehicle.

2. Description of the prior art.

The most pertinent prior U.S. Pat. is believed to be No. 4,213,729 which discloses a vehicle bumper mounted normally horizontal platform receiving and supporting the respective wheels of a wheelchair by shallow sockets therein in which the platform is tiltable about a horizontal axis toward and away from the surface of the earth. The wheelchair is loaded on the downward tilted platform by manually tilting the chair about the axis of its large wheels to lift its forward end wheels and dispose all four wheels within the platform sockets. While holding the wheelchair in this position a locking bar is moved into large wheel securing position. The platform and chair are then manually tilted to and secured in a transport position.

The present invention is distinctive over this patent by eliminating the major portion of the several small pivotally interconnected components of the patent to provide a simple open framework, substantially right triangular in side elevation, and pivotally connected at one end of its base for vertical pivoting movement of the other end of its base about a horizontal axis toward and away from the surface of the earth in which the frame surrounds a substantial portion of a folded wheelchair when disposed therein.

SUMMARY OF THE INVENTION

A tilting open framework, formed by a pair of right triangular members joined together in parallel spaced relation, form rectangular openings receiving and partially surrounding the larger wheel area of a folded wheelchair in supporting relation. An inverted U-shaped stationary frame section having its leg members rigidly secured to a tubular member projecting horizontally rearward of a vehicle rear bumper is secured thereto by a bumper attachment member. One end of the base portion of the triangular frame is pivotally connected with the legs of the stationary frame adjacent the horizontal tube for pivoting movement of the triangular-shaped frame toward and away from the surface of the earth for rolling a folded wheelchair backwardly into the open triangular frame when pivoted to a wheelchair loading and unloading position. A handle on the triangular frame permits pivoting it and a wheelchair to an elevated position with respect to the surface of the earth and disposes one end portion of the triangular frame within the U-shaped frame where it is secured by a pin latch.

The principal object of this invention is to provide an open framework removably connected with a land vehicle and having a vertically pivotal section forming a wheelchair receiving and holding portion permitting the wheelchair and open framework to be lifted to a stored transport position secured by a fixed frame.

BRIEF DESCRIPTION OF THE DRAWINGS

FIG. 1 is an exploded perspective view of the device in wheelchair transport position and illustrating the tiltable frame portion in wheelchair receiving position by dotted lines;

FIG. 2 is a fragmentary perspective view, to a larger scale, illustrating a vehicle bumper mounted socket forming member for supporting the device;

FIG. 3 is a fragmentary perspective view, to another scale, with the device in wheelchair loading position, the folded wheelchair being illustrated by broken lines;

FIG. 4 is a view similar to FIG. 3 illustrating the device in wheelchair transport position; and, FIG. 5 is a fragmentary perspective view, to a different scale, of a socket member for supporting the device adjacent a trailer hitch ball mounted on a vehicle.

DESCRIPTION OF THE PREFERRED EMBODIMENTS

Like characters of reference designate like parts in those FIGURES of the drawings in which they occur.

In the drawings:

The reference numeral 10 indicates an open framework means mounted on the rearward bumper 12 of an automotive vehicle 13 for receiving, lifting and transporting a folded wheelchair 14. The framework 10 is mounted on an open end base tube 16, preferably square in transverse section, projecting horizontally rearwardly of the vehicle bumper 12 and joined thereto by socket forming means 18 and a juncture tube 20 telescopically received at its respective end portions by the base tube 16 and socket means 18.

The frame means 10 includes a stationary section 22 and a pivoting section 24. The stationary section 22 is inverted U-shape in general configuration, having a bight portion 26 and its legs 28 rigidly secured to the respective end portions of the base tube 16 and at an acute angle with respect to its top surface, as viewed in the drawings, with the plane of the stationary section 22 upwardly inclined toward the left side of the vehicle, for the purposes presently explained.

The socket forming means 18 comprises an elongated plate 30, having a length greater than the vertical height of the vehicle bumper 12 which is secured thereto adjacent its left end, as viewed in FIGS. 3 and 4, by a plurality of bolts 32 extending through holes formed in the plate 30 and bumper 12 with the plane of the plate 30 disposed vertically by employing spacers 34, or the like, to achieve the vertical disposition of the plate. The depending end portion of the plate 30 is transversely apertured below the depending limit of the bumper, as as 36, and a socket forming tube 38 is rigidly secured to the forward surface of the plate 30 around the aperture 36 and projects horizontally forwardly of the vehicle under the bumper 12 normal to the plane of the plate 30 and parallel with the longitudinal axis of the vehicle. The juncture tube 20, dimensioned for sliding movement of its respective end portions into and out of the base tube 16 and bumper plate aperture 36, extends at one end portion into either end of the base tube 16 and is secured thereto by a bolt 40. The other end portion of the juncture tube 20, projecting into the socket tube member 38, is releaseably secured therein by a spring urged latch pin 42 mounted on and projecting through the wall of the socket tube 38 and entering a cooperating aperture formed in the wall of the juncture tube 20. When supported by the socket means 18, the base tube 16 projects horizontally rearwardly from the depending surface of the vehicle bumper 12.

The pivoting frame section 24 is formed by a pair of open right triangular-shape side members 44 and 46, each having a base rail 48, an altitude rail 50 and a hypotenuse rail 52.

The triangular frames 44 and 46 are connected together, base rails 48 downward, in laterally spaced parallel relation by a pair of base cross rods 54 and 56 extending between respective end portions of the base rails 48 and a top bar 58 interconnecting the upper ends of the altitude bars 50. The spacing between the triangular frames 44 and 46 is slightly greater than the transverse width of the wheelchair 14 when folded to a collapsed position. The length of the base rails 48 and the spacing between the base cross rods 54 and 56 is greater than the radius and less than the diameter of the large wheels 60 of the wheelchair, for the purposes presently explained.

The altitude bars 50 and their interconnecting cross rail 58 are nested by the stationary frame 22 when the pivoting frame 24 is in its uppermost lifted position (FIGS. 1 and 4). The respective end portions of the altitude rails 50 project downwardly below the plane of the base rails 48, as at 51', and are pivotally connected by bolts or pins 62 with the depending end portion of the fixed frame legs 28 to form a horizontal axis for vertical pivoting movement of the tilting frame 24. The tilting frame 24 is normally maintained in its solid line position of FIG. 1 by another spring urged latch pin 64 mounted on the fixed frame section bight portion 26 and releaseably entering an aperture 66 in the top rail 58.

An elongated handle 68 is removably secured by a plate and bolts 69 to the rearwardmost hypotenuse rail 52 adjacent its upwardly inclined end portion for pivoting the tilting frame 24 and the wheelchair 14, when contained thereby, toward and away from the surface of the earth. A striker plate 70, secured to the top rail 58, lifts the depending end of the latch pin 64 to secure the tilting frame thus permitting the use of both hands of the operator, if desired, when lifting the tilting frame and a wheelchair therein.

Obviously the framework 10 may be reversed and mounted on the socket means 18 when connected with the other or right end portion of the bumper 12.

OPERATION

Assuming the socket forming means 18 has been connected with the bumper 12 and the frame means 10 is supported thereby, as illustrated by FIGS. 3 and 4. The tilting frame 24 is released for pivoting movement toward the surface of the earth by releasing the latch pin 64 and lowering the tilting frame 24 until the base cross rod 54 is adjacent the surface of the earth by means of the handle 68. The wheelchair 14 is collapsed or folded and manually rolled rearwardly so that its rearward large wheels pass over the base cross rod 54 and are disposed on the earth's surface within the opening defined by the base rails 48 and cross members 54 and 56 and the folded back 72 of the wheelchair is disposed adjacent the top rail 58. The tilting frame 24 is then manually lifted by the handle 68. The base cross bar 54, by being disposed forwardly of the wheelchair center of gravity initially contacts a peripheral portion of the wheels 60 to maintain the wheelchair within the frame 24 and the cross rods 54 and 56, by supporting spaced-apart peripheral portions of the wheelchair wheels 60, lifts the wheelchair to the solid line position of the tilting frame 24 of FIG. 4 with the periphery of the wheels 60 partly below the plane of the base rails 48. When latched in its lifted position the hypotenuse rails 52 are disposed in a substantially horizontal plane and the frame 24 surrounds a substantial portion of the large wheels and rearward portion of the wheelchair with its center of gravity below the plane of the rails 52 thus eliminating the necessity of fastening the wheelchair therein.

The wheelchair is returned to the surface of the earth by grasping the handle 68 with one hand and releasing the latch pin 64 wherein the substantially balanced position of the wheelchair and tilting frame permits the operator to place both hands, if desired, on the handle 68 after releasing the latch pin 64 to lower the tilting frame and the wheelchair for contact with the surface of the earth.

When not in use, the frame means 10 may be disconnected from the vehicle 13 by releasing the socket latch pin 42 to withdraw the juncture tube 20.

Alternatively, the frame means 10 may be connected with a vehicle having a trailer hitch ball 74, by a modified form of the socket means, indicated at 18', (FIG. 5) having a latch pin 42' and having a lateral apertured horizontal flange portion 76 for receiving the hitch ball 74 and disposing the socket member 18' horizontally and transversely with respect to the longitudinal axis of a vehicle.

Obviously the invention is susceptible to changes or alterations without defeating its practicability. Therefore, I do not wish to be confined to the preferred embodiment shown in the drawings and described herein.

I claim:

1. In a wheelchair support for connection with an automotive vehicle bumper or other surface for transporting a folded wheelchair of the type having large rear wheels, the improvement comprising:
   a base tube secured to and projecting longitudinally rearward from the vehicle adjacent the horizontal plane of the bumper;
   a generally upright inverted U-shaped frame having legs rigidly secured to respective end portions of said base tube;
   open framework means including spaced-apart vertically disposed side members projecting laterally of said base tube and pivotally connected at one end portion between the legs of said U-shaped frame for vertical pivoting movement of their laterally remote end portions from a downward earth surface contacting wheelchair loading and unloading position to an upward wheelchair supporting position, and a cross rod extending between the respective end portion of said side members adjacent their lower limit and defining, in combination with said side members, a framework vertical opening having a length greater than the radius and less than the diameter of a wheelchair large wheels for subtending an arc of the periphery of the large wheels when supported therein and lowering the wheelchair center of gravity toward the plane of the framework opening; and, spring urged latch means for securing said framework means to said U-shaped frame in a wheelchair lifted and supported position.

2. The combination according to claim 1 and further including:

handle means connected with said framework means for moving its lateral end portion toward and away from the surface of the earth and rolling the large wheels of a folded wheelchair into and out of the framework means vertical opening when disposed adjacent the surface of the earth.

* * * * *